(No Model.) 11 Sheets—Sheet 1.

C. G. & W. H. EMERY.
CIGARETTE MACHINE.

No. 260,959. Patented July 11, 1882.

Fig. 1.

Witnesses.
Robert Emmett
A. H. Norris.

Inventors
Charles G. Emery,
William H. Emery,
by James L. Norris.
Atty.

(No Model.) 11 Sheets—Sheet 2.
C. G. & W. H. EMERY.
CIGARETTE MACHINE.

No. 260,959. Patented July 11, 1882.

Witnesses.
Inventors.
Charles G. Emery,
William H. Emery,
By James L. Norris
Atty.

(No Model.)  
11 Sheets—Sheet 3.

C. G. & W. H. EMERY.
CIGARETTE MACHINE.

No. 260,959.  
Patented July 11, 1882.

Witnesses.  
Robert Everett  
A. H. Norris

Inventors.  
Charles G. Emery  
William H. Emery  
By James L. Norris  
Atty.

(No Model.)  11 Sheets—Sheet 4.

C. G. & W. H. EMERY.
CIGARETTE MACHINE.

No. 260,959.  Patented July 11, 1882.

Witnesses.
Robert Everett
A. H. Norris

Inventors.
Charles G. Emery
and William H. Emery
By James L. Norris
Atty.

(No Model.) 11 Sheets—Sheet 7.

C. G. & W. H. EMERY.
CIGARETTE MACHINE.

No. 260,959. Patented July 11, 1882.

Witnesses:
Robt Everett
A. H. Norris

Inventors.
Charles G. Emery,
William H. Emery,
By James L. Norris,
Atty.

(No Model.)

C. G. & W. H. EMERY.
CIGARETTE MACHINE.

Patented July 11, 1882.

Witnesses.
Robert Everett
A. H. Norris

Inventors.
Charles G. Emery,
William H. Emery.
By James L. Norris.
Atty.

(No Model.)  11 Sheets—Sheet 10.

C. G. & W. H. EMERY.
CIGARETTE MACHINE.

No. 260,959.  Patented July 11, 1882.

Fig. 24.

Witnesses.
Robert Everett
A. H. Norris

Inventors.
Charles G. Emery
and William H. Emery
By James L. Norris
Atty (No Model.)   C. G. & W. H. EMERY.   11 Sheets—Sheet 11.
CIGARETTE MACHINE.

No. 260,959.   Patented July 11, 1882.

Witnesses:
Robert Pruitt
A. H. Norris

Inventors,
Charles G. Emery,
William H. Emery,
By James L. Norris
Atty

UNITED STATES PATENT OFFICE.

CHARLES G. EMERY AND WILLIAM H. EMERY, OF BROOKLYN, NEW YORK, ASSIGNORS TO SAID CHARLES G. EMERY.

CIGARETTE-MACHINE.

SPECIFICATION forming part of Letters Patent No. 260,959, dated July 11, 1882.

Application filed February 11, 1882. (No model.)

*To all whom it may concern:*

Be it known that we, CHARLES G. EMERY and WILLIAM H. EMERY, both citizens of the United States, residing at Brooklyn, in the county of Kings and State of New York, have invented new and useful Improvements in Machines for Making Cigarettes, of which the following is a specification.

The object of this invention is to produce a machine that will make a continuous cigarette, cut it into lengths suitable for cigarettes, and deliver them completed at the end of the machine continuously and automatically. Machines accomplishing such a result are shown in Letters Patent Nos. 216,164 and 231,779, respectively, granted to us June 3, 1879, and August 31, 1880.

The present machine, while somewhat similar to the machines shown in the patents referred to, is different in many respects and possesses various improvements which greatly increase its practical value, improve its operation, and enlarge its capacity.

The details of the machine and its organization and operation will be fully set forth and claimed.

In the accompanying drawings, Figures 1, $1^a$, $1^b$, and $1^c$ are sectional elevations which, taken in their order, represent a complete sectional elevation of the machine.

A longitudinal shafting extending the length of the machine beneath the table is driven by a suitable belt and pulley, as shown in Fig. $1^a$, and furnishes the power for operating various parts of the mechanism hereinafter described. A worm, 1, on this shafting, at the feed end of the machine, operates a gear-wheel, 2, and its shaft 3, from which latter a band extends to a pulley, 4, on the shaft of the lower feed-roller, 5. A gear-wheel, 6, on the opposite end of this roller-shaft, gears with a wheel, 7, on the shaft of the upper feed-roller, 8.

An endless band or feeding-belt, 9, travels over the lower feed-roller, 5, and the roller 10. The upper portion of the belt is supported by the portion 11 of the frame. (Shown in Fig. 1.) The side pieces, 12, of the frame, Figs. 2 and 3, overlap the edges of the belt 9, forming guides for the dressed tobacco as it is fed forward on the endless belt, and prevent the tobacco from getting under the edges of the belt.

Figures 2, 3, 4, 5, 6:
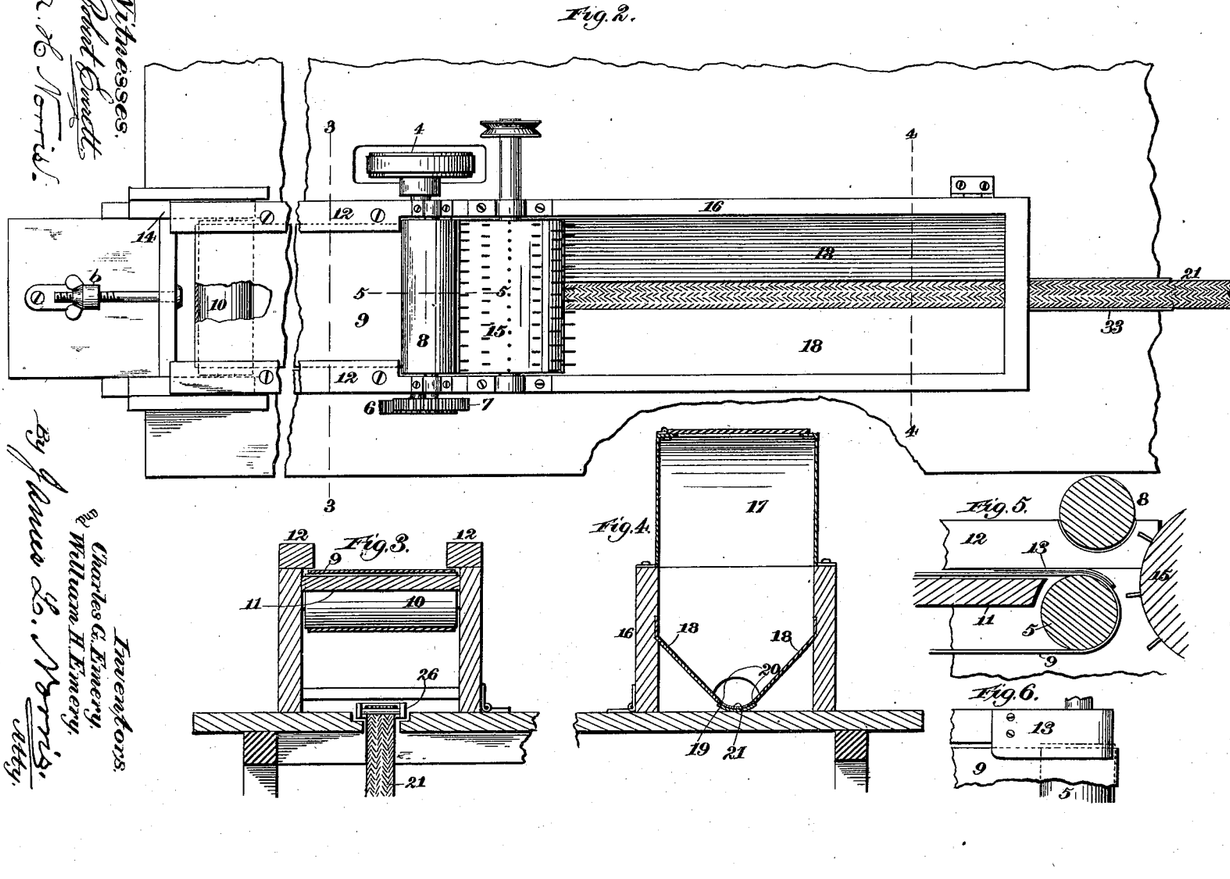
Figs. 2, $2^a$, and $2^b$ are plan views which, taken in their order, represent all but the delivery end of the machine.
Fig. 3 is a cross-section on the line 3 3 of Fig. 2.
Fig. 4 is a similar section on the line 4 4 of Fig. 2.
Fig. 5 is an elevation in section, showing the feed and picker cylinder.
Fig. 6 is a detail plan view, showing one of the plates which overlap the edge of the delivery-belt as it passes over the lower feed-roll.

Just where the belt passes down around the lower roller, 5, are placed guard-plates 13, Figs. 5 and 6, which project from the frame on each side, so as to overlap the edges of the belt, and are curved down around the roller for a short distance, as clearly seen in Fig. 5. This prevents any tobacco from getting under the belt and into the bearings of the shafts.

The endless feed-belt may be stretched and kept taut by the hand-screw b, which works in a bracket on the frame, and is attached to the shifting frame 14, which slides in ways on the frame, and in which the roller 10 has its bearing.

Figure 1:
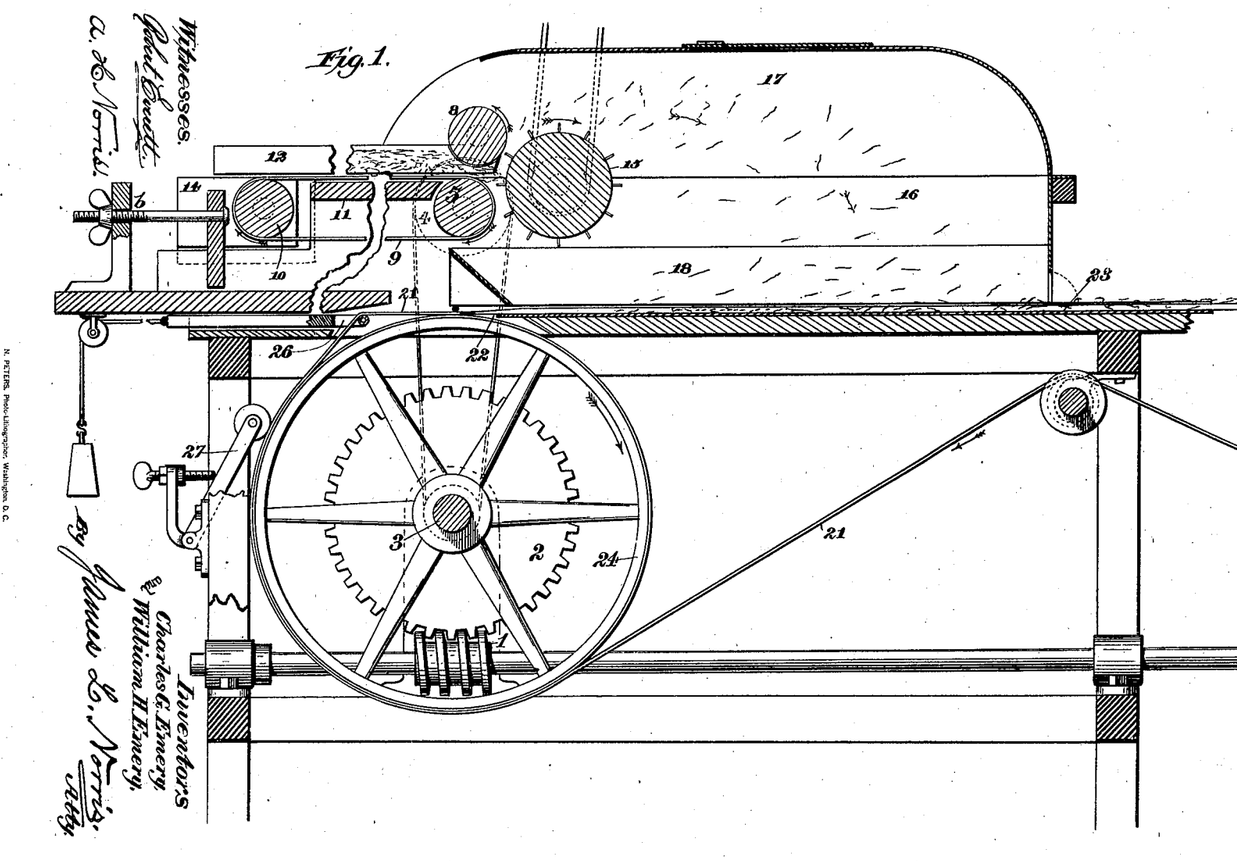

Just beyond the feed-rollers a picker-cylinder, 15, is mounted in bearings in the frame, and is driven by a belt from overhead shafting, as seen in Fig. 1. This cylinder may be made of wood with radial wire teeth arranged in parallel rows, so as to alternate with each other, or can be made of metal with projecting pins, which may be applied in any suitable manner, and be connected therewith either rigidly or flexibly. The teeth of the picker-cylinder are in close proximity to the feed-rollers, as will be seen in Fig. 1, so as to insure its catching the tobacco which is fed forward between the feed-rollers, as will be fully set forth hereinafter.

A receiving-chamber, 16, which catches the finely-dressed and disentangled tobacco as it is thrown from the picker-cylinder, incloses that cylinder, and is provided with a hood, 17, which should be provided with a door or transparent pane to furnish ready access thereto and serve as an inspection medium. This chamber has sloping or inclined sides 18. (Shown in cross-section in Fig. 4.) At the bottom of this chamber is a concave-shaped trough, 19, having a shoulder, 20, at each side, Fig. 4. The chamber is entirely separate from the trough, which commences at the staple and runs along under the chamber. The chamber fits close down on the sides of the trough; but the whole feed arrangement and chamber can be raised free and clear of it.

The trough is preferably formed of one piece of metal extending from the staple to the filler-forming chamber 38. In this trough the endless tobacco or filler carrying belt 21 runs. It enters the trough at 22, at the front end of the chamber, just below the feed-rollers and picker-cylinder, where the bottom of the chamber inclines upwardly toward the lower feed-roller, as seen in Fig. 1.

The belt emerges from the bottom of the chamber at 23 and passes on over the top of the table or frame of the machine. This belt passes around the pulley 24, which receives its motion from the worm and gearing, passes up through the chamber, as above described, along the top of the table or frame, performing the functions hereinafter to be described, then passes down through the table and over pulley 45, back to its driving-pulley again, as will be clearly seen by reference to Figs. 1, 1ª, and 1ᵇ. In order to keep the proper tension on this belt, it is passed through a loop or eye, 26, Figs. 1 and 3, to which a cord having a weight is attached, so as to maintain a constant and uniform strain on the belt. This loop or eye is a sliding frame with a small roller at one end, over which the belt passes.

To prevent the belt from rising, and to guide it directly into the trough-shaped bottom of the receiving-chamber, it is passed through a staple or guide which is secured on the frame, and is shown in section in Fig. 1 at the upper edge of the pulley 24, the belt lying between it and the face of the pulley.

In order to insure the travel of the belt and to prevent slip, an arm, 27, is pivoted to a casting secured on the frame, and carries a friction-wheel which rests upon the belt-pulley, Fig. 1. The pressure of this friction-wheel upon the belt and its pulley may be regulated by an adjusting-screw.

To take up the slack of the belt and compensate for stretching, an adjustable pressure-roller, 28, Fig. 1ª, is provided.

A bracket, 29, bolted on one of the cross-pieces of the frame, has a projecting arm with a curved slot, 30, in which slot a set-screw on the pivoted arm 31 works. This arm 31 carries the roller 28, and may be adjusted to take up the slack of the belt.

The chamber 16 is hinged, as shown in Fig. 4, so that it may be swung over to one side if desired, for replacing or repairing the filler-forming belt. To permit this movement the weight which keeps the tension on the loop 26 should be removed, so that the belt 21 will not be strained when the chamber is swung over.

Figure 7:
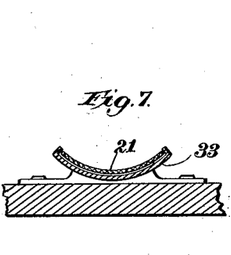
Fig. 7, a section on the line 7 7 of Fig. $2^a$.

The tobacco which has been properly dressed is placed on the endless feed-belt 9, and is carried forward between the feeding-rollers. As it emerges from between these rollers it is caught by the teeth of the picker-cylinder and completely disentangled, each fiber being separated from the others. The tobacco in this condition of separation and disentanglement is thrown by the picker-cylinder into the receiving-chamber, being also impelled therein by the air-blast created by the revolution of the picker-cylinder, which is run at a comparatively-high speed. The thread, fibers, or pieces of tobacco in this loose, free, and disentangled condition fall to the bottom of the receiving-chamber, and are directed by its inclined or sloping sides onto the belt traveling in a trough at the bottom of the chamber. This belt, passing at a uniform speed along the bottom, will receive a uniform and regular quantity of the tobacco, and will carry it along out of the chamber at the aperture in its end, as seen at 23 in the drawings. As the belt leaves the chamber it is carried forward through a packing chamber or receiver, 32, preferably of a concave or crescent shape. Fig. 7 is a section showing the belt moving along a concave carrier-trough, 33, before it reaches the packing-chamber 32, which is shown in section in Fig. 8.

Figure 8:
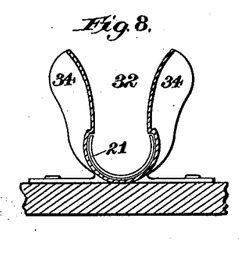
Fig. 8, a section on the line 8 8 of Fig. $2^a$.

The bottom of the packing-chamber becomes more and more concave, and also converges or decreases in diameter from the end where the belt 21 (which is termed the "filler-carrier belt,") enters to its opposite discharge end, the section of the packing-chamber at the line 8 8 being shown in Fig. 8.

The flaring sides 34 of the packing-chamber may or may not be formed in one piece with its concaved or curved bottom. An attendant can manipulate and pack the mass of tobacco carried by the belt into this chamber or receiver, as may be desired or deemed necessary.

Figure 2A:
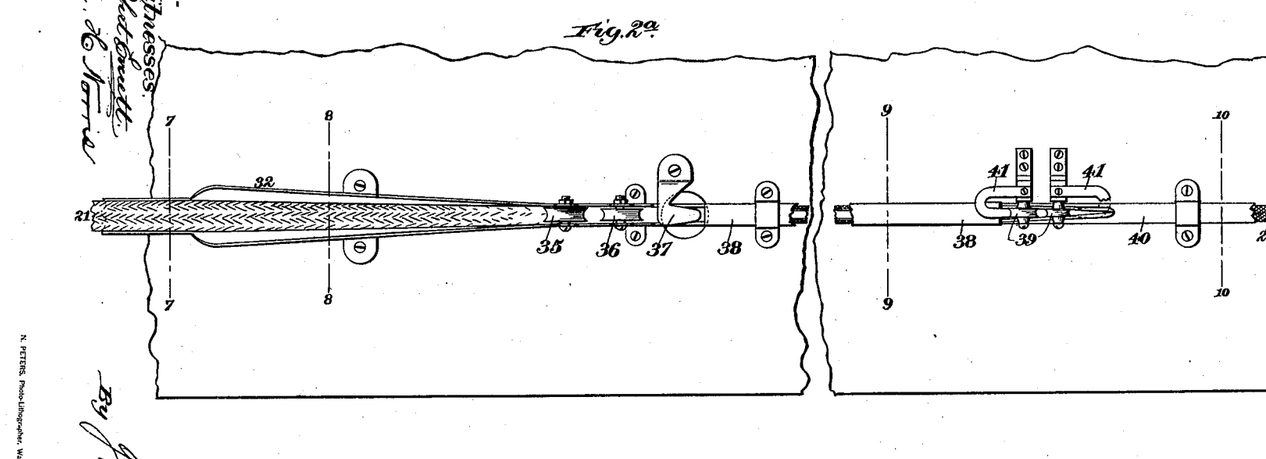

As the belt carrying the tobacco moves forward in the packing-chamber the increasing curvature of the chamber gives a substantially round or tubular form to the belt and the inclosed tobacco, the chamber becoming substantially circular in cross-section, but not closed at the top. At this point compressing-rollers 35 36 (one or more) are journaled. They have concave peripheries which compress and shape the tobacco filler. The second one, 36, is somewhat narrower than the first one. These rollers press the tobacco between the edges of the belt and compact it therein. (See Figs. 1ª and 2ª.)

As the belt and filler pass from under the rollers 35 36 they pass into a preferably cylindrical extension of the packing-chamber, and an elastic finger, 37, or a roller on an elastic support is preferably employed to still further press the tobacco into the enveloping carrier-belt. Just below this pressure finger or roller an opening is preferably made in the table to allow any loose particles of tobacco to escape. From this point the belt and inclosed filler enter the tubular filler-forming tube or conductor 38. This tubular conductor has an interior diameter or magnitude a little in excess of the diameter or magnitude of the filler proper. As the belt and inclosed filler enter this tube they are made to assume a substantially circular form, and the filler is compressed by the belt, which partly encircles it. At this stage the belt does not completely encircle the filler, the filler requiring to be further compressed and reduced in diameter.

Figure 9:
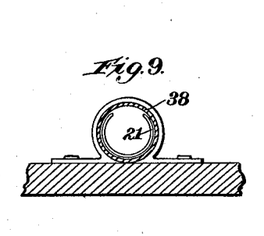
Fig. 9, a section on the line 9 9 of Fig. $2^a$.

The position of the belt relatively to its filler is clearly shown by the cross-section through the filler-forming tubes, Fig. 9.

As the belt, with the partially pressed or formed filler, emerges from the tube 38, the grooved roller 39 (or a series of grooved rollers may be used) keeps the edges of the belt apart and presses upon the filler, packing and compressing it into the belt as it passes into a conductor, 40, of a less diameter than the filler-forming tube 38, which conductor 40 brings the edges of the belt together, so that it completely encircles the filler and compresses it therein.

These rollers 39 are provided with cleaning or scraping fingers 41, secured on the roller-supporting brackets, the ends of which rest on the grooves in the rollers.

Figure 10:
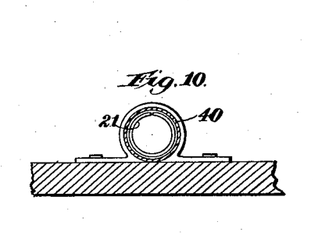
Fig. 10, a section on the line 10 10 of Fig. $2^a$.

The second roller 39 is preferably somewhat narrower than the first one, as is the case with the other pair of rollers before described. This last conductor is termed the "final filler-forming tube," because in it the filler receives and retains its form as a completed filler, ready to be enveloped or encased in a continuous paper cigarette-wrapper. The position of the belt around the filler at this time is clearly shown in Fig. 10, which is a section through the tube 40 on the line 10 10, Fig. 2ª, from which it will be seen that the edges of the belt are brought together, so that the belt completely envelopes the filler.

Figures 15, 17, 18, 19:
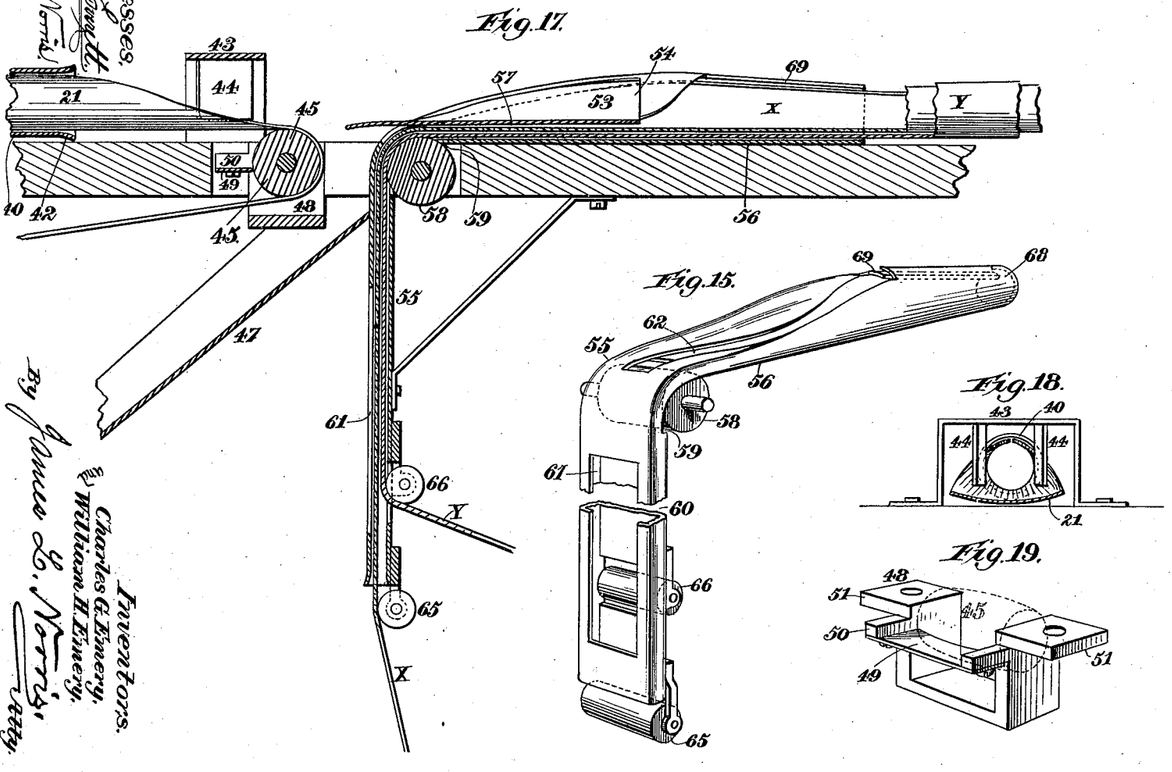
Fig. 15, a perspective view of the guide through which the paper and carrier-tape are conveyed to the filler and drawn around it.
Fig. 17, an enlarged sectional elevation of that part of the machine where the filler-belt leaves the filler and the paper and carrier-tape inclose it.
Fig. 18 is a detail view, looking into the tube from which the filler is delivered as the belt leaves it.
Fig. 19, a detail view of the casting in which the roller is mounted, over which the belt passes as it leaves the filler.

The delivery end 42 of the tube or conductor 40 preferably flares or enlarges, as seen in Fig. 17, to prevent the edge of the tube from cutting or wearing the belt as the latter is spread out or opened upon leaving the end of the tube, as will now be described. A bracket, 43, opposite the end of this tube 40, is provided with two downwardly-projecting fingers, 44.

As the belt, with its inclosed filler, emerges from the tube 40, the fingers on the bracket catch it and spread or open it on the roller 45. The belt passes around the roller 45, here leaving the fully-formed filler, passes under the table on the pulleys before mentioned, and returns to its driving pulley or wheel.

Figure 1B:
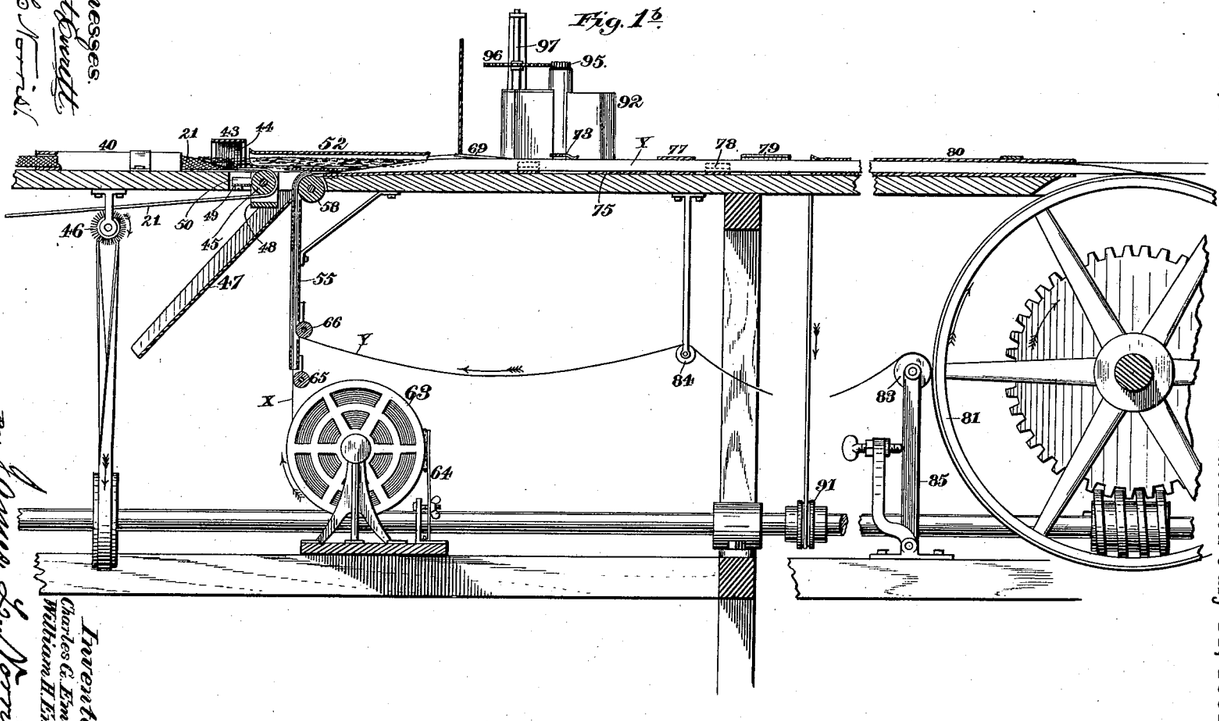

A brush-wheel, 46, mounted in a bracket on the under side of the table, Fig. 1ᵇ, is driven by a belt from the main shafting and removes any tobacco that has adhered to it. At the opening at this point in the table a spout or chute, 47, is placed to convey away any loose particles of tobacco that may fall from the belt or filler.

The roller 45 is mounted in a casting, 48, (shown detached in Fig. 19,) which has a scraper or doctor, 49, which clears it of any tobacco, gum, or other foreign matter that may get upon it. This feature is an important and valuable factor in the machine, as by keeping the roller or pulley clean, the belt is likewise kept in a clean condition.

The scraper or doctor is preferably fastened upon the bottom of the projecting arms 50 on the metal frame or casting, although it may be located in any suitable position. This casting affords a convenient means of supporting and journaling the roller, as it may be let into the opening in the frame, being sustained and secured upon the face of the table by the wings 51.

As the belt leaves the filler the latter passes across the opening in the table, being shielded, guided, and prevented from rising by a curved guard-plate, 52. (Seen in Fig. 2ᵇ and in section in Fig. 11.) Immediately beneath this guard 52, and arranged so as to receive the filler almost as the belt leaves it, is the bridge-plate 53. (Shown in Fig. 2ᵇ and in detail in Fig. 16.) This bridge-plate is curved up to a substantially circular cross-section at its end, to which point the guard 52 directs the filler. As the filler emerges from the end 54 of the bridge-plate 53 it is enveloped by the paper wrapper and the surrounding carrier tape or belt, as will now be described.

Figures 11, 12, 13, 14, 16, 24:
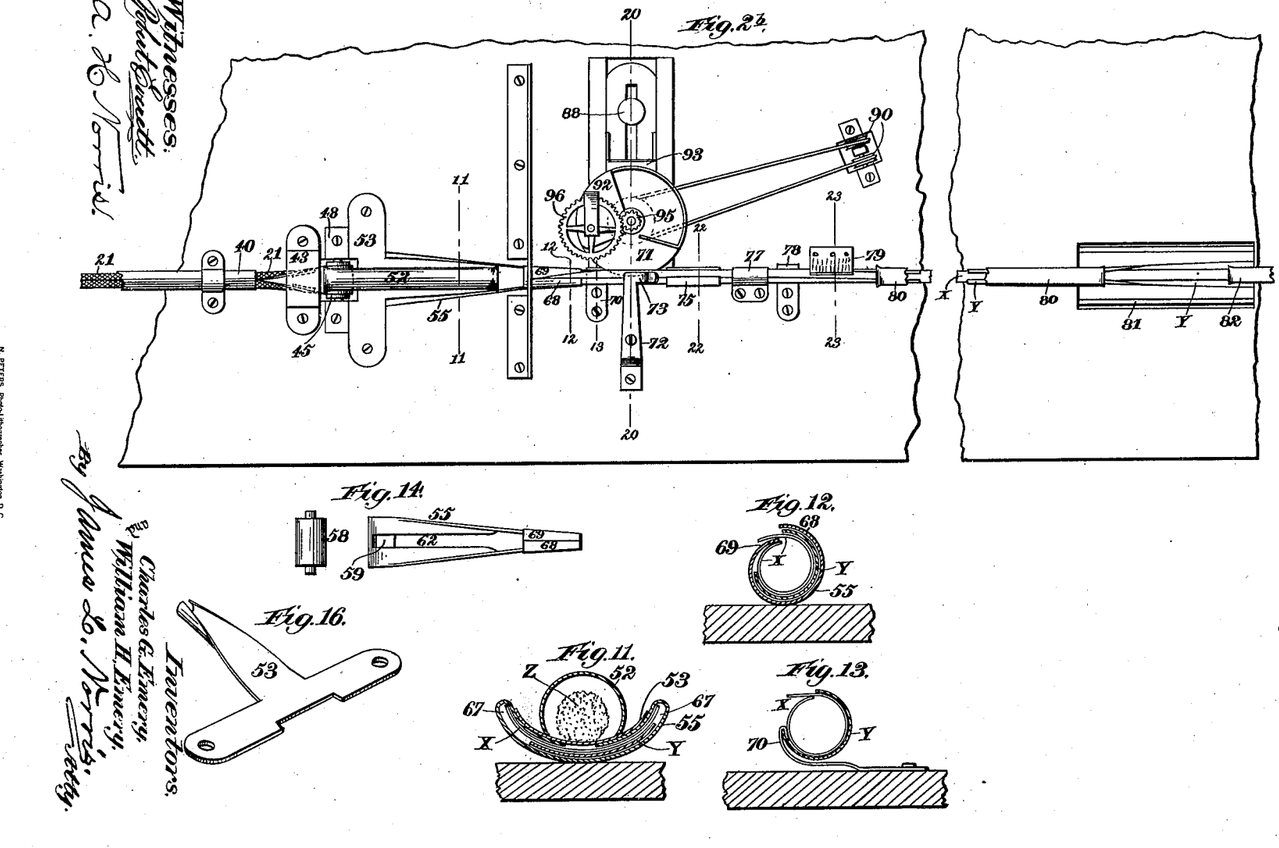
Fig. 11, a section on the line 11 11 of Fig. $2^b$.
Fig. 12, a section on the line 12 12 of Fig. $2^b$.
Fig. 13, a section on the line 13 13 of Fig. $2^b$.
Fig. 14, a detail plan view of the guide which conveys the paper and the carrier-tape to inclose the filler.
Fig. 16, a view of the guide through which the filler passes to the paper.
Fig. 24 is a plan view, showing the feed and delivery ends of the machine with the intermediate portion omitted, the parts being in duplicate, one for manufacturing cigarettes of ordinary size, the other for manufacturing cigarettes of larger size.

The paper and carrier-tape guide or conveyer 55 is shown in detail in Figs. 14 and 15, and is arranged, as shown in Fig. 17, so that its horizontal portion 56 rests upon the table under the bridge-plate 53, before mentioned, which projects a suitable distance along and into the curved or concaved open face of the guide 56, as seen at Fig. 17.

The guide 55 curves down through the opening in the table over the roller 58, which is mounted in the guide, and the face of which revolves in the opening 59, formed at the angle or turn in the under face of the guide. The depending or vertical portion 60 of the guide is hollow, and is of a rectangular shape in cross-section, and is preferably formed with the open face shown at 61. The upper face or wall of the horizontal portion of this hollow guide is slotted at 62. The under side of the guide gradually curves upwardly until it is substantially round, with overlapping edges, or, rather, spiral in cross-section, and of a tapering or funnel shape, as clearly seen in Fig. 15. The edges of the slotted upper face are curved, in a measure approximating the curving of the under side of the guide, and incline upwardly to the overlapping edges of the conical or funnel end, being cut away somewhat, so as to form shoulders where the edges overlap.

The paper strip X, to form the cigarette-wrapper, is wound on a suitable drum or roller, 63, having a spring tension device, 64, for regulating its speed, mounted in a bracket on one of the beams of the frame. The paper passes into the conductor or guide 55 over a small roller, 65, journaled thereon, and passes up through it.

Just above the point where the paper enters the guide or conductor (which will be called the "paper and belt conductor") the carrier-belt Y enters the conductor over a small roller, 66. This belt is of less width than the paper wrapper. The wrapper and belt pass in contact, face to face, up the conductor, (the paper of course being on the upper side,) over the roller 58, and along through the horizontal portion of the guide.

The sectional view, Fig. 11, will now represent the relative positions of the parts. 52 represents the guard-plate; 53, the bridge-plate; Z, the filler; 55, the hollow paper and belt conductor; X, the paper strip, and Y the paper carrier-belt or tape.

As the paper and belt are drawn along the curved side or edge 67 of the upper slotted portion of the conductor 56 it will curve up and direct the belt and paper around and over the filler as it issues from the bridge-plate. Following this operation the opposite curved side, 68, of the conductor curves the other side of the paper and tape around and over the filler. As the filler, paper, and tape move forward together the right side of the paper, or that side curved around the filler by the curved edge 68, will be directed by the edge 68 between the overlapping edges of the funnel or conical end of the conductor.

The converging or funnel shape of the conductor also draws the opposite edges of the paper and tape together, causing the paper to overlap and drawing the upper edge between the overlapping edges of the funnel, so that the edge 69 of the funnel lies between the lapping edges of the paper. This is clearly shown in Fig. 12, where it will be noticed, as before mentioned, that the paper strip is wider than the carrier-tape. As the parts in this condition emerge from the funnel-shaped end of the conductor a hook, 70, secured on the frame, catches over the edge of the tape and holds or draws it down out of the way of the rotating pasting-disk 71, Fig. 20, the upper face of which is supplied with paste, and the operation of which will be presently described. The disk 71 revolves beneath the overlapping edge of the paper wrapper and applies paste to the under side of the overlapping edge, Fig. 20. A spring, 72, secured on the frame, holds the edge of the paper down on the face of the pasting-disk. This arm may be provided with a pressing-finger, 73, Fig. 2$^b$, or a roller, 74, Fig. 20.

Figure 22:
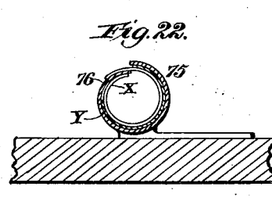
Fig. 22 is a section on line 22 22 of Fig. $2^b$.
Figure 23:
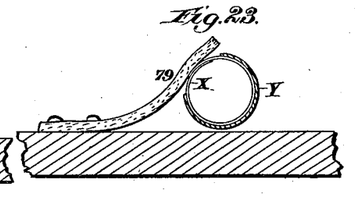
Fig. 23 is a section on line 23 23 of Fig. $2^b$.
Figure 24:
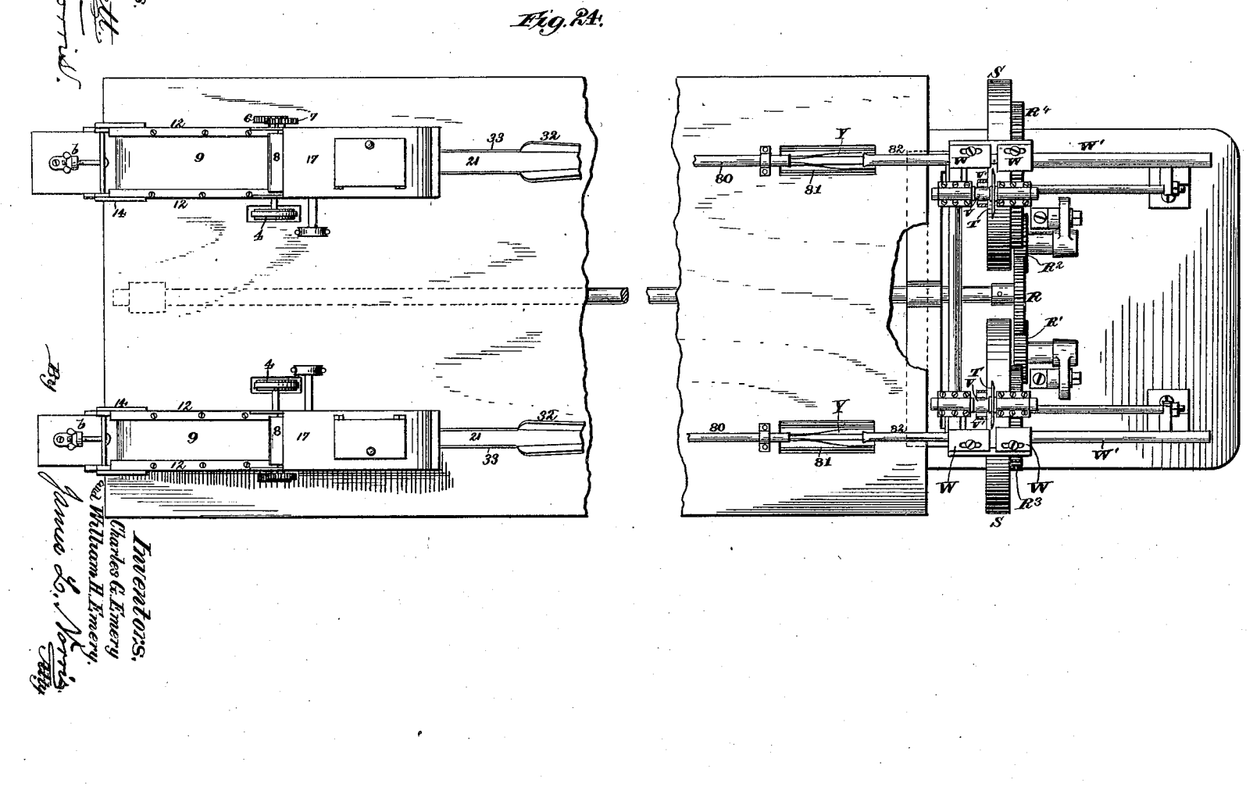
Figure 25:
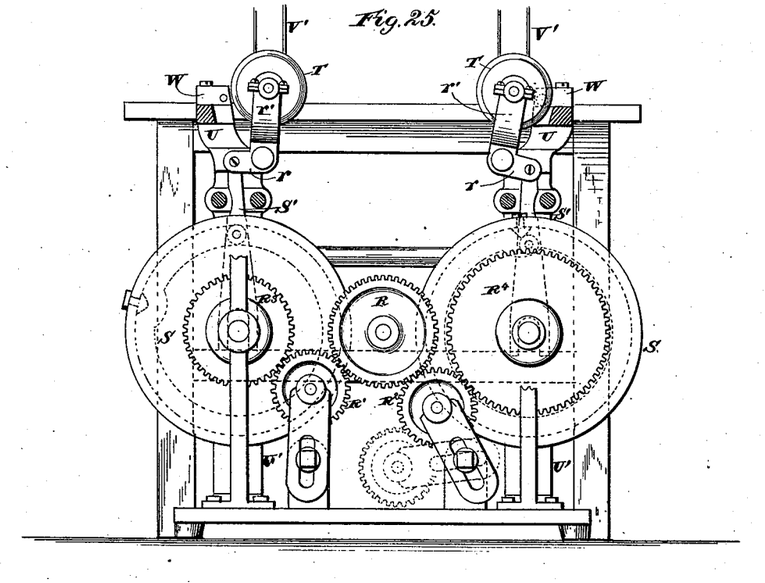
Fig. 25 is an elevation of the rear end of the machine, showing the mechanism for cutting off the cigarettes into proper lengths.

As the parts move along they are drawn through a conductor, 75, having overlapping edges, (shown in section in Fig. 22,) which holds the paper and tape closely around the filler. The under side of the outer overlapping edge of the paper having the paste thereon is drawn over the face 76 of this conductor, so that the paste is smeared and evenly distributed thereon. From this conductor the filler, in its inclosing paper, and tape pass into the cylindrical former 77, which presses the pasted edge of the paper down on the other edge of the paper, completely and perfectly sealing the wrapper. As the parts issue from this cylindrical former a hook, 78, similar to that before mentioned and shown, Fig. 13, still holds down the edge of the tape. These hooks have the effect of twisting or deflecting the tape from its true line, and the reason, as stated, is to prevent the paste from getting on the endless tape or belt. Just beyond this hook 78 is a smoother or presser, 79, of felt, leather, or other suitable material, which presses down the pasted edges of the wrapper. This is shown in section in Fig. 23. From this smoother or presser the continuous cigarette and carrier-belt pass through the tubular conductor 80, which is of sufficient diameter to permit the continuous cigarette and its enveloping carrier tape or belt to pass through it without further compressing the cigarette. The belt here leaves the continuous cigarette, passing down through an opening in the table, around its driving-pulley 81, the continuous cigarette passing on through the tube 82 to the cutting apparatus, which will be described hereinafter.

The paper carrier tape or belt Y passes around its pulley 81, over pulleys 83 84, to the paper and belt conductor before described. The pulley 83 is also a friction-pulley, and is mounted upon a pivoted arm, 85, and is pressed upon the pulley 81 by a screw, so as to maintain the requisite tension on the belt and prevent it from slipping on pulley 81. The pulley 81 is rotated by a cog-wheel on its shaft, which gears with a worm on the main shafting.

A sufficient space is left between the tubes 80 and 82 (where the belt Y leaves the continuous cigarette) to allow the continuous cigarette to be pulled out on the table in case of any obstruction in its passage. If necessary, the continuous cigarette may be cut or severed at this point, in case of an obstruction, and afterward be inserted in the tube 82.

The mechanism for applying the paste to the wrapper will now be described. It should be understood, however, that other apparatus for applying paste or cement may be used without departing from our invention herein set forth, though the apparatus shown is practical, possesses novel features, and is especially adapted for use in this machine.

Figures 20, 21:
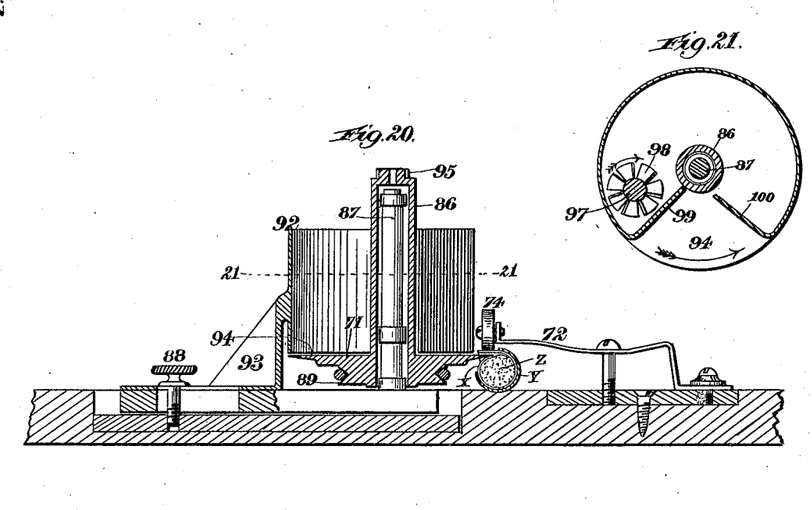
Fig. 20 is a section on the line 20 20 of Fig. $2^b$, showing the operation for applying the paste or cement to the paper wrapper.
Fig. 21 is a section on line 21 21 of Fig. 20.

The pasting-disk 71 has an upright tubular hub, 86, which fits down over an upright shaft, 87, carried by a sliding frame, which moves in a way or a guide in or on the table, and which can be adjusted toward or from the continuous cigarette, as may be desired, being held in any desired position by a set-screw, 88, which works in a slot in the shifting frame, as clearly shown in Figs. 2$^b$ and 20. The lower part of the disk 71 is grooved, and constitutes a pulley, 89, around which the driving cord or belt passes. This belt passes over two small pulleys, 90, journaled on the table, and is actuated by a pulley, 91, on the main shafting. The pasting-disk can thus be driven at any required speed.

A paste-receptacle, 92, of which the pasting-disk constitutes the bottom, is placed over the upright revolving hub of the disk, and is supported by a bracket-arm, 93, secured on the sliding frame. The paste-receptacle 92 is of the formation shown in cross-section, Fig. 21— that is, it is bent in so as to form a V-shaped recess in its side, leaving a pasting-surface, 94, of the wheel exposed, from which the paper receives its paste, as before mentioned.

The vertical hub of the pasting-disk carries a pinion, 95, gearing with a wheel, 96, on a vertical shaft, 97, which has its bearings in the top of the paste-receptacle and in a bracket mounted thereon. This shaft extends to the face of the pasting-disk, and carries at or near its lower end a number of wings or flat blades, 98. These wings or flat blades project radially or obliquely from the shaft, and are inclined upwardly, transversely in the direction of rotation of the shaft, which is shown by the arrow. This tends to throw or force the paste against the face of the disk, keep it thoroughly stirred and in a smooth condition, and causes it to flow with a uniform supply onto the pasting-surface 94 of the disk.

The bottom of the inwardly-inclined wall 99 has just space enough between it and the pasting-disk to allow a sufficient quantity of paste to pass. A somewhat larger space is left between the bottom of the other inwardly-inclined wall, 100, and the pasting-disk, so that if any more paste passes than is required to cement the edges of the wrapper it will re-enter the paste-receptacle.

The wall or inwardly-inclined side 99 of the pasting-chamber is in contact with the revolving hub of the disk. The edge of this wall scrapes the hub constantly as the hub revolves in close proximity thereto. The other inwardly-inclined wall, 100, is not in contact with the hub, but a small space is left between it and the hub, so that any paste that might possibly be carried by the hub past the first edge, 99, could re-enter the paste-receptacle. The direction of rotation of the disk prevents the paste from flowing out of the opening intervening between the edge of the wall 100 and the revolving hub.

From the above description the operation of the apparatus will be understood. Paste of suitable consistency being placed in the receptacle, a uniform and proper supply will be automatically delivered to the pasting-surface 94 and be applied to the wrapper of the cigarette. The paste-receptacle should be provided with a suitable shield or guard for protecting the paste therein.

The continuous cigarette may be cut into lengths by any apparatus suitable for the purpose. Apparatus for this purpose which has proven perfectly satisfactory is shown and will be briefly described; but no claim is made to it herein, as it is an invention set forth in an application for Letters Patent filed in the United States Patent Office August 5, 1881, Serial No. 39,297, allowed November 28, 1881, of which Charles G. Emery, one of the joint applicants herein, is the sole owner by assignment.

Before describing the cutting mechanism, however, reference should be made to the machine as shown in Fig. 24, where it will be seen that two cigarette-machines are mounted on the same frame, and are actuated by a common line of shafting beneath the table, as described. As shown in this figure, the machines may be of different sizes, one making a larger cigarette than the other. Of course the relative speed of such machines and the requisite speeds of the different parts of each machine, which have been fully described, may be obtained by suitable-sized pulleys and gears, as will be well understood by those familiar with mechanics.

The picker-cylinders, which are shown as actuated from overhead shafting, may be mounted upon a common shaft and be run by a single belt. The separate arrangement shown in Fig. 24 is, however, regarded as a preferable construction.

The mechanism for cutting the continuous cigarettes from both machines into measured lengths is shown in Fig. 1c, and from Fig. 24 on.

Figures 26, 28, 29:
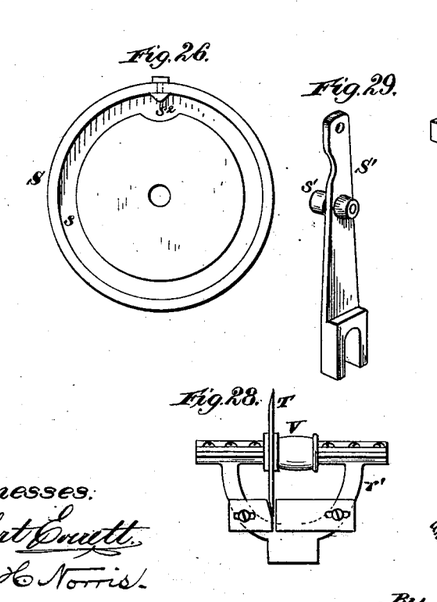
Fig. 26 is a view of one of the cam-wheels that causes the vibration of one of the cutting-disks.
Fig. 28, a view of one of the cutting-disks mounted in its vibrating support, showing the scrapers for clearing the disk.
Fig. 29 is a view of the reciprocating arm that is operated by the cam-wheel to vibrate the support carrying the cutting-disk.

A gear-wheel, R, on the end of the main shafting of the machine, gears with and actuates two pinions, R' R², which gear with cog-wheels R³ R⁴ on suitable shafts fixed in a frame, as shown. The pinions R' R² are mounted on movable arms held by set-screws, so that either of them may be thrown out of action, if desired. The cog-wheels are fast to the cam-wheels S S, having the cam-grooves s s, in which rollers s' s', on the reciprocating arms S' S', Fig. 29, work. The forked ends of these arms straddle the shafts of the cam-wheels, and the arms are thrown up and down by the cam-notches s² s². The upper end of each reciprocating arm S' is pivoted to and operates the elbow-levers r, which carry the brackets r', in which the cutting-disks T are journaled.

Figure 27:
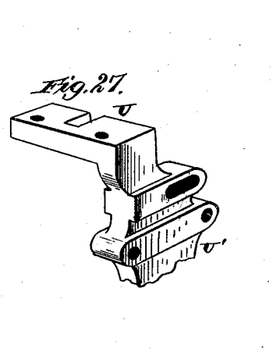
Fig. 27, a view of one of the brackets that support the blocks through which the continuous cigarette passes as it is cut.

U, Fig. 27, are castings, which are supported by the frame of the cutting mechanism, or constitute the upper portions of the standards U' of the frame. The elbow-levers r are pivoted on the casting U. The shafts of the cutting-disk are journaled in the forked arms of the brackets r', above mentioned, and are each provided with a small drum or pulley, V, on which a belt, V', from overhead shafting runs to rotate the cutting-disk at any desired speed. Across the base of the forked arms r' a scraper is placed to keep the cutting-disk clear and insure its making a clean cut.

Guide-blocks W W, through which the continuous cigarette issuing from the conductor 82 passes, are mounted on the castings U, and the cutting-disks enter between these blocks to sever the cigarette.

More detailed description of this portion of the machine seems unnecessary.

The construction and operation will be clear from the foregoing. The cut cigarettes pass through the tube W' and fall completed from its end into a suitable receptacle.

Many of the mere details of the apparatus described herein may obviously be varied without departing from the spirit of the invention.

In conclusion, we will state that the herein-described feature of a rotary picker-cylinder arranged transversely to the feed is the invention of Charles G. Emery, one of the present applicants, and that a claim for the same has been made in another application filed in the United States Patent Office on the 27th day of March, 1882.

What we claim as our invention is—

1. The combination, in a cigarette-machine, of mechanism for feeding the tobacco, with the picker-cylinder arranged transversely to the feed and adapted to completely separate and disentangle the tobacco, so as to prepare it to form the filler suitable for a cigarette, the receiving-chamber with inclined sides for catching the tobacco thrown from the picker-cylinder, and a trough located at the bottom of the receiving-chamber and traversed by the endless tobacco or filler carrying belt, substantially as described.

2. The combination of the endless feed-belt, the rollers over which it passes, and the metal guard-plates which overlap the edges of the belt and are curved down over the lower feed-roller, substantially as set set forth.

3. The combination of the feed-belt, its rollers, the overlapping side pieces of the frame, the curved metal plates, also overlapping the edges of the belt, and the upper feed-roller, substantially as set forth.

4. The combination of tobacco-feeding mechanism, mechanism for separating and disentangling the tobacco, and a receiving-chamber with sloping sides, substantially as set forth.

5. The combination of the tobacco-feeding mechanism, the picker-cylinder or disentangling and separating mechanism, the receiving-chamber with converging or sloping sides, and an endless filler-forming belt moving along the contracted bottom of the receiving-chamber, substantially as set forth.

6. The combination of the tobacco-feeding mechanism, the picker-cylinder, the receiving-chamber with sloping or converging sides, the trough at the bottom of the chamber, and an endless filler-carrying belt which moves through the trough, substantially as set forth.

7. In a cigarette-machine, the packing-chamber having the concave, semicircular, or crescent-shaped bottom in cross-section, in which the endless tobacco-carrying belt runs, and the raised flaring sides, substantially as set forth.

8. The combination of the endless filler-carrying belt and the packing-chamber in the bottom of which the belt travels, and which tapers or contracts from the end where the belt enters to its opposite end, so as to gradually compress the belt and the tobacco carried thereby, substantially as set forth.

9. The combination of the endless filler-carrying belt, tobacco-feeding mechanism, the picker-cylinder, the receiving-chamber into which the tobacco is thrown by the picker-cylinder, the sloping sides of said chamber, which direct the disentangled and separated falling tobacco onto the moving filler-carrying belt, the open packing-receptacle in which the tobacco may be manipulated and packed by an attendant, and in which it is compressed and reduced in bulk as the belt is drawn around it, one or more rollers or pulleys which press the tobacco into the curved belt, and tubular conductors of reducing diameter, which fold the belt completely around the filler and compress and form it therein, substantially as set forth.

10. The combination of the filler-forming mechanism, the bridge-plate onto which the filler passes when the carrying-belt leaves it, and the paper and tape conductor which guides the paper and the endless carrier-tape, substantially as set forth.

11. The combination of the final filler-forming tube, the bracket straddling the end of the tube, the fingers which spread the filler-carrying belt, and the roller over which the belt passes beneath the table, substantially as set forth.

12. The combination of the filler-forming mechanism, the bridge-plate which supports the continuous filler as the filler-belt leaves it, the hollow paper and belt conductor into the curved face of which the bridge-plate projects, the curved edge of the upper slotted face of the paper and belt conductor, and its tapering or funnel-shaped end with the overlapping edges, substantially as and for the purpose set forth.

13. The combined paper and tape or belt conductor in which the carrier-tape and paper travel, having the hollow vertical portion projecting beneath the table, and the horizontal portion with the funnel-shaped end, which directs the paper and belt around the completed filler and overlaps the edges of the paper, the conductor being formed substantially as shown in Fig. 15.

14. The combination of filler-forming mechanism, mechanism which simultaneously draws the paper and carrier-belt around the filler and overlaps the edges of the paper, mechanism for pasting the edge of the paper, and mechanism for cutting off the cigarettes into regulated lengths from the continuous cigarette, substantially as set forth.

15. The combination of filler-forming mechanism, mechanism for directing the paper and carrier-tape around the filler and overlapping the edges of the paper, a hook or catch which holds the tape down out of the way, pasting mechanism for applying paste to the paper, and mechanism for cutting off the cigarettes in regulated lengths from the continuous cigarette, substantially as set forth.

16. The combination of the filler-forming mechanism, the conductor for directing the paper and belt or tape around the filler and overlapping the edges of the paper, a pasting-disk which applies paste to the edge of the paper, a tubular guide with overlapping edges which evenly distributes the paste on the paper, and a tubular guide which presses the edges of the paper together, substantially as set forth.

17. The combination of filler-forming mechanism, mechanism which simultaneously envelops the filler in the paper wrapper and directs the carrier-tape around it, pasting mechanism, a tubular guide which presses the edges of the paper together, a smoother for acting on the pasted edge of the paper, and mechanism for cutting off the cigarettes in regulated lengths from the continuous cigarette, substantially as set forth.

18. The combination of filler-forming mechanism, a conductor for directing the paper wrapper and carrier-tape around the filler, a hook or catch which holds the tape down out of the way, a pasting-disk, a tubular guide which presses the edges of the paper together, another hook or catch for holding down the tape, a smoother, the final forming-tube, and mechanism for cutting off cigarettes in regulated lengths from the continous cigarette, substantially as set forth.

19. The combination of the filler-forming mechanism, the drum or pulley for the continuous wrapper, the tension therefor, the endless tape, the paper and tape or belt conductor, and pasting mechanism, substantially as set forth.

20. The combination of filler-forming mechanism, the endless paper wrapper, the carrier-tape of less width than the wrapper, mechanism for directing the wrapper and belt around the filler, mechanism for pasting the wrapper, uniting its edges, and forming the continuous cigarette, and mechanism for cutting the continuous cigarette into regulated lengths, substantially as set forth.

21. The combination of the filler-forming mechanism, mechanism for directing the paper wrapper and tape around the filler, pasting mechanism, a guide which presses the pasted edges of the wrapper together, the guide-blocks through which the finished cigarette is delivered, and a cutter which severs the continuous cigarette into regulated lengths between the blocks, substantially as set forth.

22. The combination of the rotating pasting-disk, its upright hub, the pinion thereon, the paste-receptacle, the shafting extending down into the paste-receptacle, the radial wings or blades thereon, and the pinion on the shaft, substantially as set forth.

23. The combination of the pasting-disk, its upright hub, the paste-receptacle, the rotating shaft extending into the paste-receptacle, and the inclined radial wings or blades thereon.

24. The combination of the pasting-disk, its upright hub, the paste-receptacle, and the inwardly-inclined walls of the receptacle, one of which is in contact with the rotating hub of the disk, there being a small space between the hub and the edge of the other wall, substantially as set forth.

25. The combination of the endless carrier belt or tape Y, the tube 80, the tube 82, and mechanism for cutting the continuous cigarette into regulated lengths, the tube 82 being placed at such a distance from tube 80 as to allow the continuous cigarette to be manipulated or a portion pulled out in case of any obstruction or stoppage of it when advancing to the cutting apparatus.

In testimony whereof we have hereunto set our hands in the presence of two subscribing witnesses.

CHARLES G. EMERY.
WILLIAM H. EMERY.

Witnesses:
JOHN D. LITTLE,
CHARLES H. PIERCE.